United States Patent [19]

Lill

[11] 4,181,393

[45] Jan. 1, 1980

[54] INTERCONNECTING MEANS FOR COIL WINDINGS AND OVERLOAD PROTECTOR

[75] Inventor: John F. Lill, Harrisburg, Pa.

[73] Assignee: AMP Incorporated, Harrisburg, Pa.

[21] Appl. No.: 910,047

[22] Filed: May 26, 1978

Related U.S. Application Data

[63] Continuation-in-part of Ser. No. 887,585, Mar. 17, 1978, Pat. No. 4,147,398.

[51] Int. Cl.$^2$ .......................................... H05K 11/00
[52] U.S. Cl. ................................... 339/98; 310/68 C; 310/71
[58] Field of Search ................. 310/68 C, 71; 361/41, 361/25, 26, 27; 336/192; 339/95 D, 98

[56] References Cited

U.S. PATENT DOCUMENTS

| | | | |
|---|---|---|---|
| 2,967,269 | 1/1961 | Vaughan | 310/68 C |
| 3,553,621 | 1/1971 | Lane | 310/68 C |
| 3,925,748 | 12/1975 | Slocum | 310/68 C |
| 3,979,615 | 9/1976 | Neff | 339/95 D |
| 4,004,169 | 1/1977 | Charlton | 310/71 |
| 4,061,935 | 12/1977 | Kandpal | 310/68 C |

FOREIGN PATENT DOCUMENTS 1330797  9/1973  United Kingdom ................. 336/192

Primary Examiner—Neil Abrams
Attorney, Agent, or Firm—Frederick W. Raring

[57] ABSTRACT

An electrical connecting means and overload protector mounting means for a motor stator comprises a housing having a plurality of terminal receiving cavities therein which receive the ends of the motor winding conductors. The cavities are dimensioned to receive electrical terminals of the type which have wire-receiving slots therein such that upon movement of the terminals into the cavities, the ends of the windings are electrically and mechanically connected to the terminals. The terminals are also connected to lead wires by means of which the control circuits to the motor are interconnected to the windings. The housing has integral supporting means for an overload protector, the arrangement being such that the protector is located adjacent to the motor windings. The electrical connections to the protector are also achieved by terminals which are inserted into cavities in the housing.

7 Claims, 8 Drawing Figures

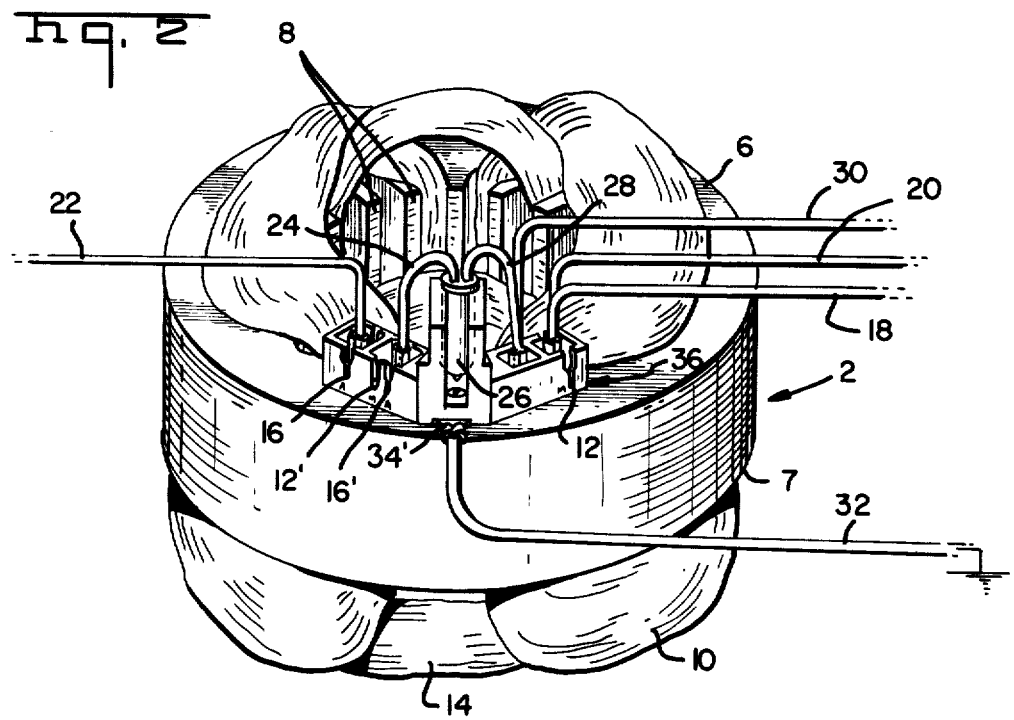
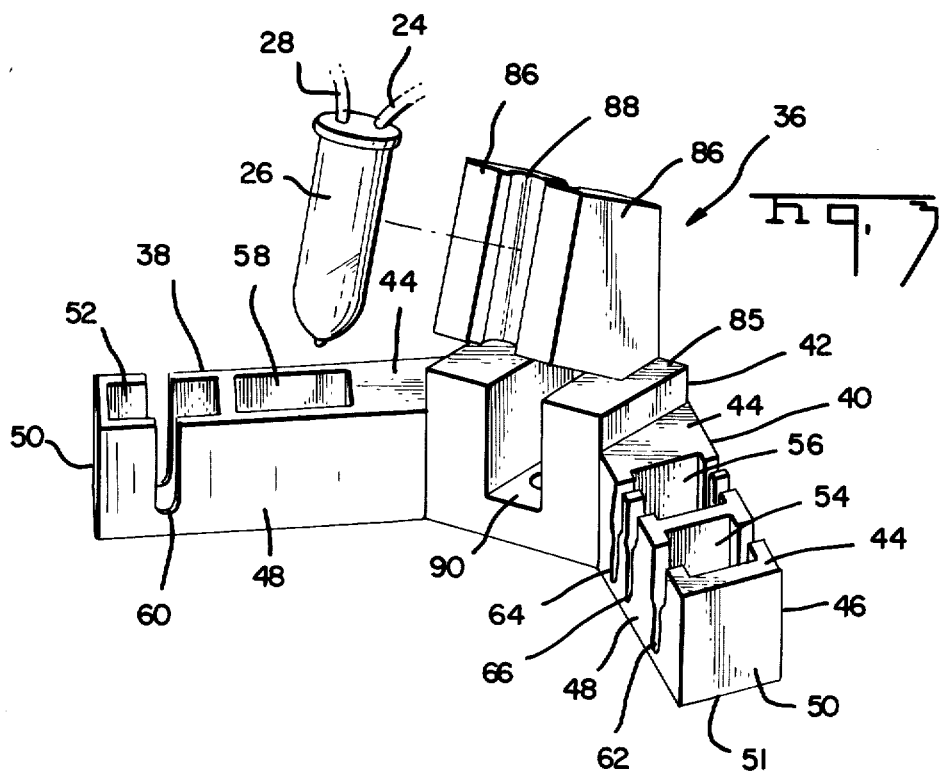

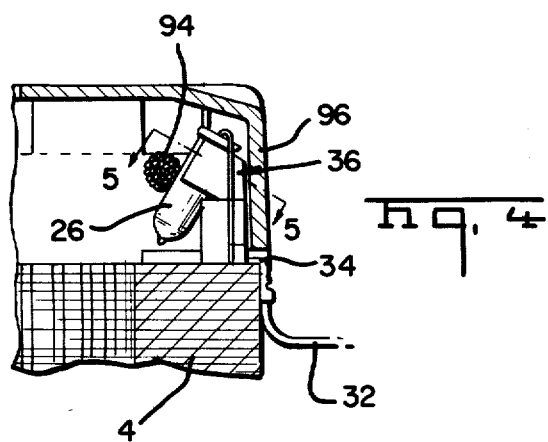
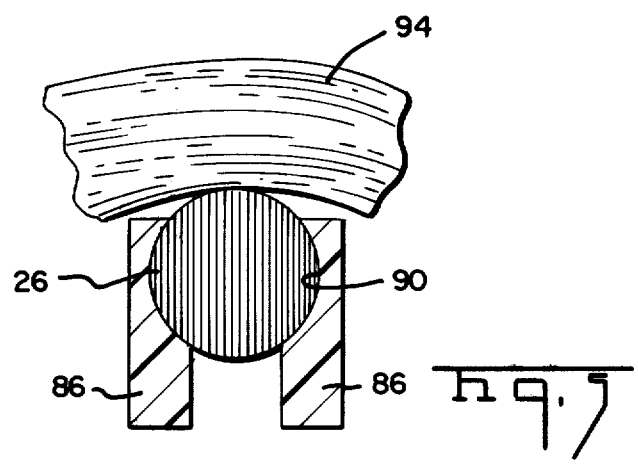
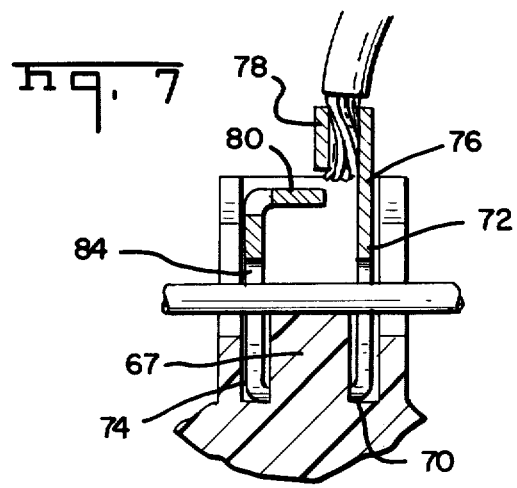

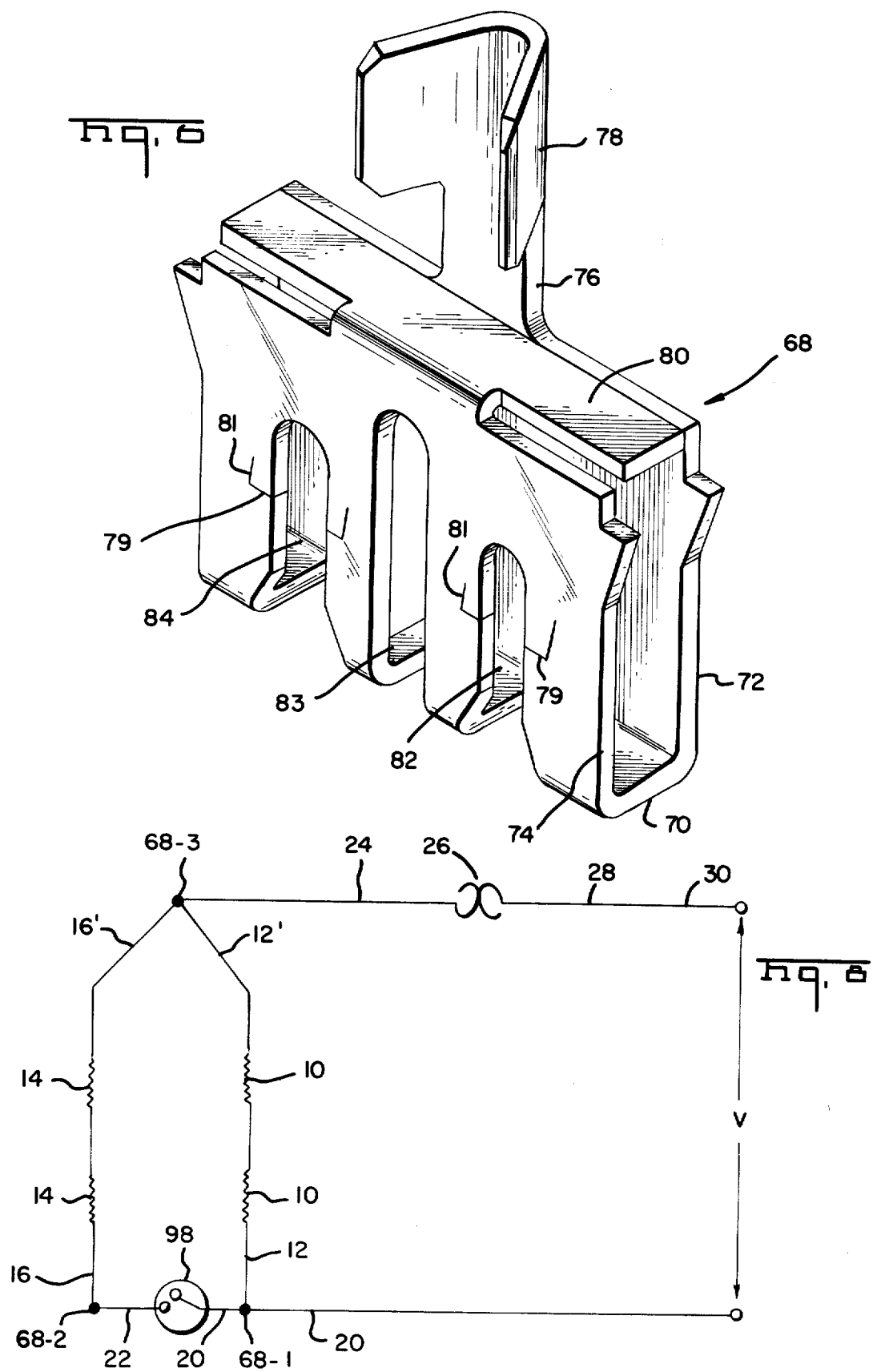

INTERCONNECTING MEANS FOR COIL WINDINGS AND OVERLOAD PROTECTOR

This application is a continuation-in-part of my co-pending application Ser. No. 887,585 filed Mar. 17, 1978, now U.S. Pat. No. 4,147,398.

BACKGROUND OF THE INVENTION

The specific embodiment of the invention disclosed herein is particularly intended for a single phase induction motor however, other uses for the principles of the invention will be apparent from the disclosure.

Conventional induction motors are usually provided with an overload protector in the form of a normally closed switch which is positioned against the coil windings of the motor and is connected to the motor circuitry in a manner such that the motor is stopped if the switch is opened as a result of a temperature rise in the motor windings. After the motor windings cool, the switch closes so that the motor can be restarted.

In conventional induction motor manufacturing processes, the overload protector, which is usually in the form of a relatively small cylindrical body, is manually mounted on the motor windings by a technician and then secured in its desired position by cord lacings. The electrical connections to the ends of the windings are similarly secured in position on the stator by lacings which are applied during the manufacturing process.

In my co-pending application Ser. No. 887,585, I disclose an improved connecting means for forming the electrical connections between the lead wires and the ends of the coil windings, an improvement which avoids the practice of lacing the electrical connections to the winding and which eliminates several time consuming assembly operations. The instant invention is directed to the achievement of a connecting and mounting means for forming the electrical connections to the coil windings and securing the protector in close proximity to the windings.

In accordance with the principles of the invention, I provide an insulating housing which is adapted to be mounted on one face of the motor stator and into which a plurality of terminal-receiving cavities extend. The cavities have wire-admitting slots associated therewith so that the ends of the windings on the stator can be positioned in the cavities and upon subsequent insertion of the terminals into the cavities, electrical contact is established with the ends of the windings. The terminals are connected to the lead wires to form the connections extending to the control circuits for the motor. The electrical protector for the motor is supported in an integral supporting means on the housing which is located such that the protector is disposed adjacent to a portion of the coil winding. The electrical leads extending from the protector are also connected to the control circuits by terminals received in cavities in the housing.

It is accordingly an improved mounting means for a thermal protector of a motor stator. A further object is to provide a combination mounting means for thermal protector and connector means for making electrical connections between and among the ends of the coil windings, the lead wires extending from the protector, and the lead wires extending from the stator to the control circuits for the motor. A further object is to provide a connecting and mounting means which will facilitate and simplify the manufacture of motor stators.

These and other objects of the invention are achieved in a preferred embodiment thereof which is briefly described in the foregoing abstract, which is described in detail below, and which is shown in the accompanying drawing in which:

FIG. 2 is a view similar to FIG. 1 but showing the housing mounted on the stator.

FIG. 3 is a perspective view of the housing with the thermal protector exploded therefrom.

FIG. 4 is a fragmentary side view of the stator showing the manner in which the protector is positioned against the stator windings.

FIG. 5 is a view taken along the lines 5—5 of FIG. 4.

FIG. 6 is a perspective view of an electrical terminal which is used in the practice of the invention.

FIG. 7 is a sectional side view taken through one of the cavities of the housing.

FIG. 8 is a circuit diagram illustrating the disclosed embodiment.

Figure 1:
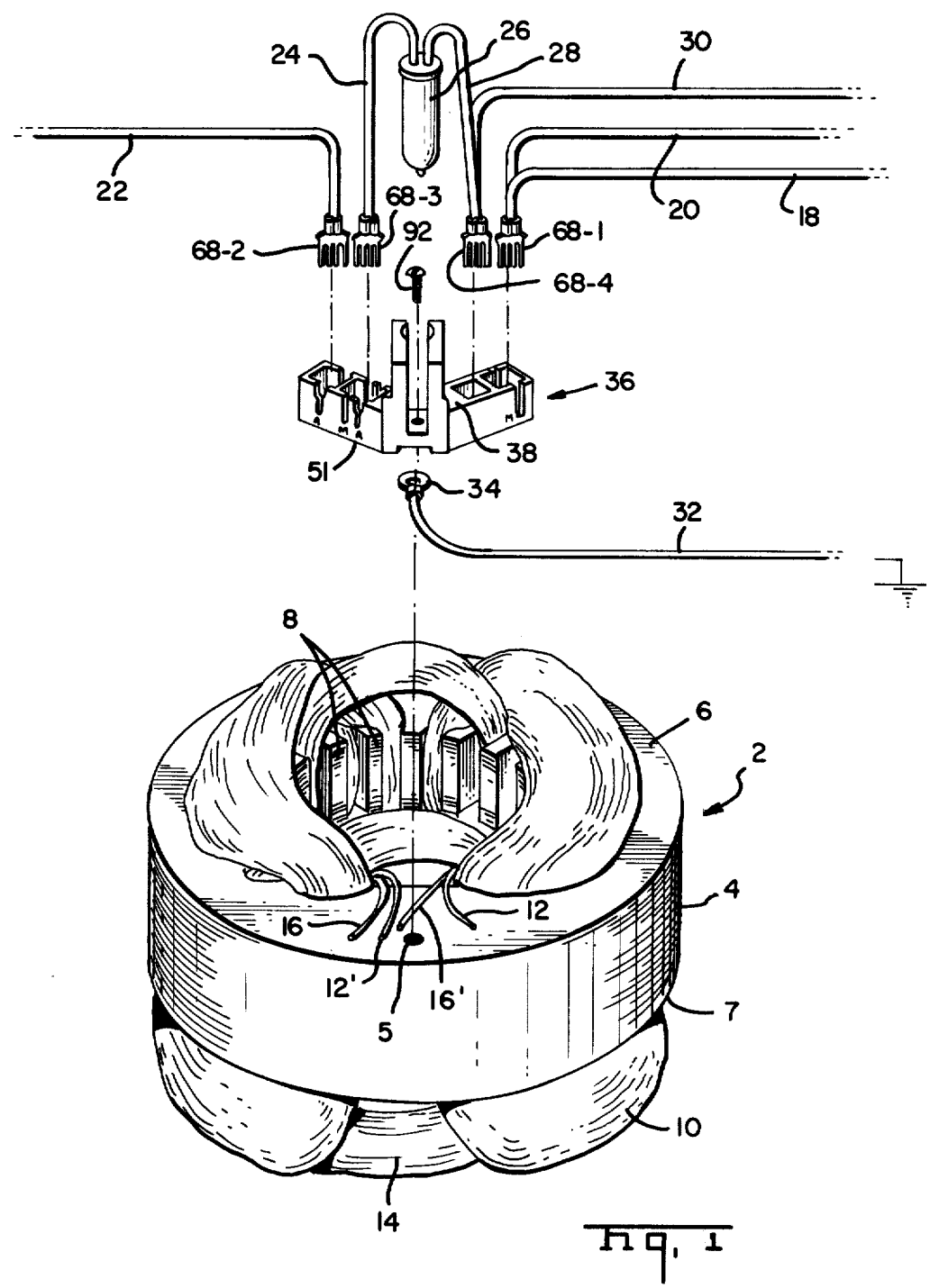
FIG. 1 is a perspective exploded view showing a motor stator, a housing in accordance with the invention, a thermal protector for the motor, and the associated lead wires for the protector and stator windings.

Referring first to FIGS. 1–3, the stator 2 of a typical split phase two-pole induction motor comprises a stack 4 of general circular laminae having an upper face 6, and a lower face 7. A plurality of spaced-apart teeth 8 extend inwardly towards the center of the stator and the windings 12, 14 extend between selected adjacent teeth and beyond the upper and lower faces 6, 7 as shown. The main winding 10 is usually of a relatively coarse gage wire while the auxiliary winding 14 is of relatively finer gage wire as indicated in the drawing. The ends 12, 12' and 16, 16' of the main and auxiliary windings respectively are located adjacent to a threaded hole 5 in the upper surface 6 of the stator preparatory to their being connected to the lead wires as will be described below.

The connections to the ends of the windings comprise a first lead means 18, 20 consisting of two wires which are commonly connected to a terminal 68-1, a second lead 22 which is connected to a terminal 68-2, a third lead 24 which is connected to a terminal 68-3, and a fourth lead 28, 30 consisting of two wires which are connected to a terminal 68-4. The lead 24 and the portion 28 of the lead means 28, 30 extend from the cylindrical body 26 of thermal protector. Protectors of this type comprise a normally closed switch which opens in response to a temperature rise and which automatically closes when the temperature returns to a predetermined level. An additional electrical connection may be required in the form of a ground wire 32 which has a ring tongue terminal 34 on its end and which is connected to the stator by a fastener, as will also be described below.

A housing and mounting means 36 is provided which houses the electrical connections required and supports the thermal protector. This housing is advantageously of a molded thermo-plastic material such as nylon. This housing is generally V-shaped and comprises divergent arms 38, 40 which extend from an enlarged center section 42. Each of the arms 38, 40 has a terminal-receiving or upper face 44, as viewed in the drawing, front and back sidewalls, 46, 48, endwalls 50 and a base surface 51. First, second, third, and fourth cavities 52, 54, 56, and 58 respectively extend into the upper faces 44 of the arms as shown, the first cavity being adjacent to the outer end of the arm 38, the second cavity being adjacent to the outer end of the arm 40, and third cavity 56 extending into the arm 40 adjacent to the center section 42, and the fourth cavity 58 extending into the arm 38 adjacent to the center section 42. The cavities are identified in this irregular order in order selectively to associate the cavities with the wires 18, 20, 22, 24, and 28.

Wire-admitting slots are provided in the sidewalls 46, 48 to permit placement of the ends of the coil windings selectively in the first, second, and third cavities 52, 54, and 56. The slots 60 for the cavity 52 are of a width such that they will receive the end portion 12 of the main winding 10 and the slot 62 which is associated with the cavity 54 has a width such that it will admit the end portion 16 of the auxiliary winding 14 but it will refuse admittance to either end 12, 12' of the main winding. As shown, the slots 62 are of a reduced width in their lower portions to achieve this selective admission of the ends 16, 16'. Two wire-admitting slots 64, 66 are provided in each sidewall 46, 48 in association with the third cavity 56. One of these slots is dimensioned to receive the end 12' of the main wire and the others, like the slot 62, are dimensioned to receive only the end portion 16' of the auxiliary winding 14. As shown in FIG. 7, each of the cavities has a supporting boss 67 extending upwardly from its inner end. These bosses support a wire positioned with its axis extending across the cavity so that upon insertion of a terminal, the wire will be received in the wire-receiving slot of the terminal as described below.

The terminals 68-1, 68-2, 68-3 and 68-4 are identical and are of the type shown in FIG. 6. Each terminal is generally U-shaped having web 70 and parallel sidewalls 72, 74. A neck portion 76 extends upwardly from the sidewall 72 and has a crimpable ferrule 78 on its end by means of which it can be electrically and mechanically connected to a lead wire. A flange 80 extends inwardly from the upper edge of the sidewall 74 towards the sidewall 72 and serves to stabilize and rigidify the sidewalls. Wire-receiving slot means 82, 84 extend upwardly through the web 70 and through the sidewalls, the wire-receiving slot 82 being of a width such that it will receive, and establish electrical contact with, either of the ends 16, 16' of the auxiliary winding while the wire-receiving slot 84 is dimensioned to receive either of the ends 12, 12' of the main winding. A central slot 83 is also provided. Slot 83 does not receive a wire but serves to separate the spring systems of the two wire-receiving slots. Electrical contact is achieved by virtue of the fact that the edges of these wire-receiving slots 82, 84 penetrate the insulation of the wire and establish electrical contact with the core thereof.

It will be noted in FIG. 6 that each of the slots 82, 84 has shear lines or cut lines 79, 81 associated therewith. The shear lines 79 extend from the edges of the slot laterally away from the slot and the shear lines 81 extend from the ends of the shear lines 79 parallel to the slot and towards the inner end of the slot. These shear lines are produced during manufacture of the terminal by shearing the blank along the lines 79, 81 and bending the material bounded by these lines out of the plane of the blank. Thereafter, the bent out material is pushed or bent back into the plane of the blank. When this material is returned to the plane of the blank, a shoulder is formed on each edge of each slot which shoulder faces downwardly as viewed in FIG. 6 and towards the wire-receiving end of the slot. The shoulder is formed because of the fact that the irregularities produced in the planes of shearing prevent the material bounded by the shear lines from returning to its original position and it is displaced outwardly towards the center of the slot. The very narrow shoulders thus produced provide edges which cut into or penetrate the varnish-type insulation of the wire while the wire is moved into the slot.

The terminals 68 can be inserted into the cavities in only one orientation and the wire-admitting slots 60, 62, 64, and 66 in the housing are located such that the appropriate wire-receiving slots, 82, or 84, will engage the wire which is positioned in a particular cavity.

The cavity 58 does not have any wire-admitting slots associated therewith although it does receive the terminal 68-4. The terminal 68-4 serves primarily as a strain relief for the conductor 28 which extends from the protector so that any tensile forces applied to the conductor 30 will not be transmitted through the conductor 28 to the terminal protector.

The central section 42 of the housing has a pair of spaced-apart columns 86 extending upwardly from its upper surface 85 and the opposed surfaces of the columns are provided with arcuate depressions 88 dimensioned to receive therebetween the cylindrical housing of the protector 26. A recess 90 is provided in the lower portion of the central section 42 and an opening extends through the floor of this recess for the accommodation of a screw 92.

The housing 36 is assembled to the stator 2 after the stator has been dipped in a polymeric material and baked at an elevated temperature to cure the polymer. After the baking steps, the ends 12, 12', and 16, 16' and the windings will be located as shown adjacent to the threaded opening 5 in the upper surface 6. The ring tongue terminal 34 is located in alignment with the threaded opening and the housing 36 is then positioned on the upper surface 6 and secured thereto by means of the screw 92 so that the electrical connection of the ground wire 32 of the stator is achieved. Thereafter, the end 12 of the winding 10 is positioned in the slot 60, the end 16 of the winding 14 is positioned in the slot 62, and the remaining ends 12', 16' of the windings are positioned in the appropriate slots 64, 66 so that they will rest upon the support bosses 67 in the cavities. The terminals are then inserted into the cavities and the terminals and the lead wires are thereby connected to the appropriate ends of the windings. Thus, the end 12 of the main winding is connected to the terminal 68-1 and thereby to conductors 18, 20, the end 16 of the auxiliary winding is connected to the terminal 68-2 and to the conductor 22, and the remaining ends 12', 16' are commonly connected to the terminal 68-3 and to the lead 24 which extends from the protector. As previously mentioned, the terminal 68-4 serves a mechanical function rather than an electrical function in that it serves as a strain relief for the remaining lead 28 of the protector. The protector is thereafter positioned in and between the columns 86 and as shown in FIGS. 4 and 5, it will be positioned beneath a portion 94 of the auxiliary winding. In FIG. 4, the motor housing is shown at 96 in covering relationship to the housing 36 and the protector.

The circuitry for a typical split phase two-pole induction motor is shown in FIG. 8 and the connections among the conductors shown in FIGS. 1 and 2 are identified. As indicated in FIG. 8, the conductors 20 and 22 extend to a centrifugal switch 98 which is normally closed so that power is supplied to both of the windings 10, 14 when the motor is started. After the motor attains its operating speed, the centrifugal switch 98 opens and power is supplied only to the main winding 10.

What is claimed is:

1. An insulating housing means which is intended to be mounted on one face of the stator of an induction motor having a main winding and an auxiliary winding, said housing comprising:

an insulating block having a terminal-receiving face, first, second, and third terminal-receiving cavities extending into said terminal-receiving face, a first wire-admitting slot means in said housing communicating with said first cavity, a second wire-admitting slot means in said housing communicating with said second cavity, and third wire-admitting slot means communicating with said third cavity, said third wire-admitting slot means comprising two side-by-side slot means, said first and second wire-admitting slot means comprising a single slot means dimensioned to receive a single wire, each of said cavities being dimensioned to receive a terminal having first and second wire-receiving slots extending therein from one end thereof, thermal protector supporting means integral with, and extending from, said housing, said supporting means being dimensioned to receive and support a thermal protector whereby, upon locating one end of said main winding in said slot means associated with said first cavity and with the axis thereof extending across said first cavity, locating one end of said auxiliary winding in said slot means associated with said second cavity and with the axis thereof extending across said second cavity, and locating the other ends of said main and auxiliary windings in said slot means associated with said third cavity and with the axes of said other ends extending across said third cavity, and upon inserting first and second terminals into said first and second cavities respectively, contact is established with said one end of said main and auxiliary windings and upon inserting a third terminal into said third cavity, contact is established with said other ends of said main and auxiliary windings, and upon placement of said thermal protector in said supporting means, said protector is mounted adjacent to said windings.

2. An insulating housing means as set forth in claim 1, said thermal protector supporting means comprising a pair of spaced-apart projections on said terminal-receiving face.

3. An insulating housing as set forth in claim 2, said projections extending centrally from said terminal-receiving face and between said cavities.

4. In combination with a stator of an electric motor, said stator having first and second windings thereon, connecting means serving to connect a first electrical lead to one end of said first winding, for connecting a second electrical lead to one end of said second winding, for commonly connecting the other ends of said first and second windings to a third lead which extends from a thermal protector, and means for supporting said protector adjacent to one of said windings, said connecting means comprising:

insulating housing means having first, second, and third terminal-receiving cavities therein, said housing means being mounted on said stator adjacent to said windings, a first wire-admitting slot means in said housing communicating with said first cavity, a second wire-admitting slot means in said housing communicating with said second cavity, and third wire-admitting slot means communicating with said third cavity, said third wire-admitting slot means comprising two side-by-side slot means, said first and second wire-admitting slot means comprising a single slot means dimensioned to receive a single wire, first, second, and third terminals, each of said terminals comprising a plate-like section having first and second side-by-side wire-receiving slots extending therein from one end thereof, said first wire-receiving slot being dimensioned to receive an established electrical contact width, one end of said first winding, said second wire-receiving slot being dimensioned to receive, and establishing contact with, one end of said second winding, said first lead being connected to said first terminal, said second lead being connected to said second terminal, and said third lead extending from said overload protector and being connected to said third terminal, and integral thermal protector supporting means on said housing, said thermal protector being disposed in said supporting means and proximate to one of said windings.

5. The combination set forth in claim 4, said first, second, and third leads being connected to said first, second, and third terminals respectively by crimped electrical connections.

6. The combination set forth in claims 4 or 5, said housing having a fourth terminal-receiving cavity therein, a fourth lead extending from said overload protector, said fourth lead being connected to a fourth terminal whereby, said leads from said overload protector are mechanically secured in said housing.

7. The combination set forth in claim 4, said thermal protector supporting means comprising a pair of spaced-apart projections on said housing, said thermal protector being held between said projections.

* * * * *